US00RE38120E

(19) United States
(12) Reissued Patent
Bordwell et al.

(10) Patent Number: US RE38,120 E
(45) Date of Reissued Patent: May 20, 2003

(54) CEILING FAN OUTLET BOX

(75) Inventors: Mark A. Bordwell, Madison, IN (US); James D. McCutcheon, Athens, TN (US)

(73) Assignee: Thomas & Betts International, Inc., Sparks, NV (US)

(21) Appl. No.: 09/685,936

(22) Filed: Oct. 10, 2000

Related U.S. Patent Documents

Reissue of:
(64) Patent No.: 5,824,952
Issued: Oct. 20, 1998
Appl. No.: 08/375,438
Filed: Jan. 17, 1995

(51) Int. Cl.[7] ..... H02G 3/08
(52) U.S. Cl. ..... 174/53; 174/61; 174/63; 220/3.3; 278/343
(58) Field of Search ..... 174/53, 54, 61, 174/63, 48, 50; 248/343; 220/3.2, 3.3, 3.9, 4.02; 52/39; 362/404

(56) References Cited

U.S. PATENT DOCUMENTS

| | | | |
|---|---|---|---|
| 929,097 | A | 7/1909 | Lutz et al. |
| 1,477,806 | A | 12/1923 | Bonnell |
| 1,537,780 | A | 5/1925 | Oefinger |
| 2,140,861 | A | 12/1938 | Steketee |
| 2,374,993 | A | 5/1945 | Haynes |
| 2,448,001 | A | 8/1948 | Maurette |
| 2,671,821 | A | 3/1954 | Zientowski et al. |
| 2,891,755 | A | 6/1959 | Clark |
| 2,906,488 | A | 9/1959 | Wolar |
| 3,474,994 | A | 10/1969 | Swanquist |
| 3,676,570 | A | 7/1972 | Gabb |
| 3,930,631 | A | 1/1976 | Laarm |
| 4,023,697 | A | 5/1977 | Marrero |
| 4,048,491 | A | 9/1977 | Wessman |
| 4,064,427 | A | 12/1977 | Hansen et al. |
| 4,183,486 | A | 1/1980 | Esoldi |
| 4,295,575 | A | 10/1981 | Flachbarth |
| 4,390,105 | A | 6/1983 | Graves |
| 4,410,160 | A | 10/1983 | Alperin et al. |
| 4,463,923 | A | 8/1984 | Reiker |
| 4,513,940 | A | 4/1985 | Alpherin et al. |
| 4,513,994 | A | 4/1985 | Dover et al. |
| 4,518,141 | A | 5/1985 | Parkin |
| 4,538,786 | A | 9/1985 | Manning |
| 4,576,349 | A | 3/1986 | Dearing |
| D288,289 | S | 2/1987 | Reiker |
| 4,645,158 | A | 2/1987 | Manning |

(List continued on next page.)

FOREIGN PATENT DOCUMENTS

| | | |
|---|---|---|
| GB | 2 194 691 A | 3/1988 |

*Primary Examiner*—Dean A. Reichard
*Assistant Examiner*—Dhiru R Patel
(74) *Attorney, Agent, or Firm*—Hoffman & Baron, LLP

(57) ABSTRACT

An improved electrical ceiling box including a top portion bounded by a peripheral side portion, with a pair of diametrically opposed ear lugs rigidly secured to the side portion. Each ear lug has a pair of ears integrally formed therewith extending inwardly into the interior cavity of the box. A first ear fits within a recess formed in the bottom edge of the box, while a second ear extends through a slot formed in the side portion of the box. The second ear has a mounting hole formed therein adapted for threaded engagement with a self-tapping screw, while the first ear has a receiving hole formed therethrough for supporting the distal end of the screw. In a preferred embodiment, the box has a substantially hexagonal configuration. In an alternative embodiment, the box has a circular configuration and is shallower, thereby eliminating the need for a pair of slots for receiving the first ears. Preferably, the ear lugs are formed from a heavier gauge material than the remainder of the box for improved strength and resistance to breakage from fatigue.

14 Claims, 6 Drawing Sheets

U.S. PATENT DOCUMENTS

| | | | | | |
|---|---|---|---|---|---|
| 4,659,051 | A | | 4/1987 | Propp et al. | |
| 4,684,092 | A | | 8/1987 | Reiker | |
| 4,770,311 | A | * | 9/1988 | Wang | 220/3.3 |
| 4,880,128 | A | | 11/1989 | Jorgensen | |
| RE33,147 | E | | 1/1990 | Reiker | |
| 4,892,211 | A | | 1/1990 | Jorgensen | |
| 4,919,292 | A | * | 4/1990 | Hsu | 220/3.2 |
| 4,988,067 | A | | 1/1991 | Propp et al. | |
| 5,009,383 | A | | 4/1991 | Chapman | |
| 5,085,393 | A | | 2/1992 | Ryan | |
| 5,150,868 | A | | 9/1992 | Kaden | |
| 5,234,119 | A | | 8/1993 | Jorgensen et al. | |
| 5,303,894 | A | | 4/1994 | Deschamps et al. | |
| RE34,603 | E | | 5/1994 | Caison et al. | |
| 5,359,152 | A | * | 10/1994 | Hone-Lin | 174/53 |
| 5,393,026 | A | | 2/1995 | Deschamps et al. | |
| 5,628,418 | A | * | 5/1997 | Deschamps et al. | 220/3.2 |
| 5,726,385 | A | * | 3/1998 | Lowery et al. | 179/53 |
| 5,900,583 | A | * | 5/1999 | Russo | 174/61 |

* cited by examiner

CEILING FAN OUTLET BOX

Matter enclosed in heavy brackets [ ] appears in the original patent but forms no part of this reissue specification; matter printed in italics indicates the additions made by reissue.

FIELD OF THE INVENTION

This invention relates generally to electrical ceiling boxes and, more particularly, to an electrical box for mounting and supporting a ceiling fan, having improved mounting lugs for engaging the screws used to secure a ceiling fan.

BACKGROUND OF THE INVENTION

Ceiling fans have become increasingly popular in both commercial and residential settings as a means for improving air circulation and, in many instances, reducing overall electrical consumption. Ceiling fan mounting assemblies come in a variety of configurations, but the vast majority are designed to be secured to a conventional electrical outlet box installed in a ceiling, i.e., a ceiling box. Conventional ceiling boxes have a pair of inwardly extending ears (flanges) integrally formed with the side portion, with each ear having a threaded hole for engaging a mounting screw used to support a ceiling fan. For ceiling fans, conventional ceiling boxes do not provide sufficient strength to serve as support structures, thus requiring additional mounting means for proper support.

Numerous efforts have been made to construct an electrical box suitable for use with heavier ceiling fans. One such effort is disclosed in U.S. Pat. No. 4,892,211 issued Jan. 9, 1990 to Jorgensen. The Jorgensen device is an electrical box having a diametrically opposed pair of ears in the same general manner as conventional boxes. In the Jorgensen box, however, the ears are unthreaded through holes, aligned with threaded mounting holes formed in the top portion of the box. The mounting screws used to support a ceiling fan pass through the holes in the ears and threadedly engage the mounting holes formed in the box. According to Jorgensen, this arrangement eliminates fatigue which can cause the ears to break off of conventional boxes. With the Jorgensen box, however, it is essential that a certain amount of clearance be maintained above the box to insure that the mounting screws are adequately engaged within the mounting holes formed in the top of the box. On some occasions, when an outlet box is mounted directly beneath a stud or ceiling joist, great care must be exercised to properly align the box during installation to insure that such clearance is maintained. Also, it is frequently difficult to thread the screws into the mounting holes since the holes, being recessed within the box, are hard to see, especially when a ceiling fan mounting plate blocks the installer's view. A need has been recognized for an improved electrical box for use with a ceiling fan which does not require any unusual care during installation of either the box or a ceiling fan, and which provides a superior mounting structure for supporting the fan.

SUMMARY OF THE INVENTION

It is an object of this invention to provide an electrical ceiling box specially adapted for mounting and supporting a ceiling fan.

It is another object to provide such an electrical box which is a structurally superior mounting surface as compared to conventional ceiling boxes.

A further object is to provide a ceiling box which is installed in a conventional manner.

A still further object is to provide a ceiling box which is structurally superior and allows installation of a ceiling fan in a conventional manner.

In order to achieve these and other objects, the present invention is an electrical box adapted to mount and support a ceiling fan, comprising a top portion and a side portion, the side portion rigidly coupled to the top portion and extending substantially normal thereto, forming a box open at one end and defining an interior cavity. A pair of first ears are rigidly secured to the side portion and extend inwardly into the interior cavity of the box, each of the first ears having a mounting hole formed therethrough threadedly engageable with a mounting screw used to attach a ceiling fan. A pair of second ears are rigidly secured to the side portion intermediate the first ears and the top portion and also extend inwardly into the interior cavity. Each of the second ears has an unthreaded receiving hole formed therethrough, through which the mounting screw can extend. The second ears provide lateral support for the mounting screws to prevent flexing of the first ears. In the preferred embodiment, the ears are integrally formed on a pair of ear lugs, which are welded to exterior surfaces of the box.

The above stated and other objects will become clear to those skilled in the art upon reading the following detailed description, taken in conjunction with the appended drawing figures.

DETAILED DESCRIPTION OF THE PREFERRED EMBODIMENT

Figure 1:
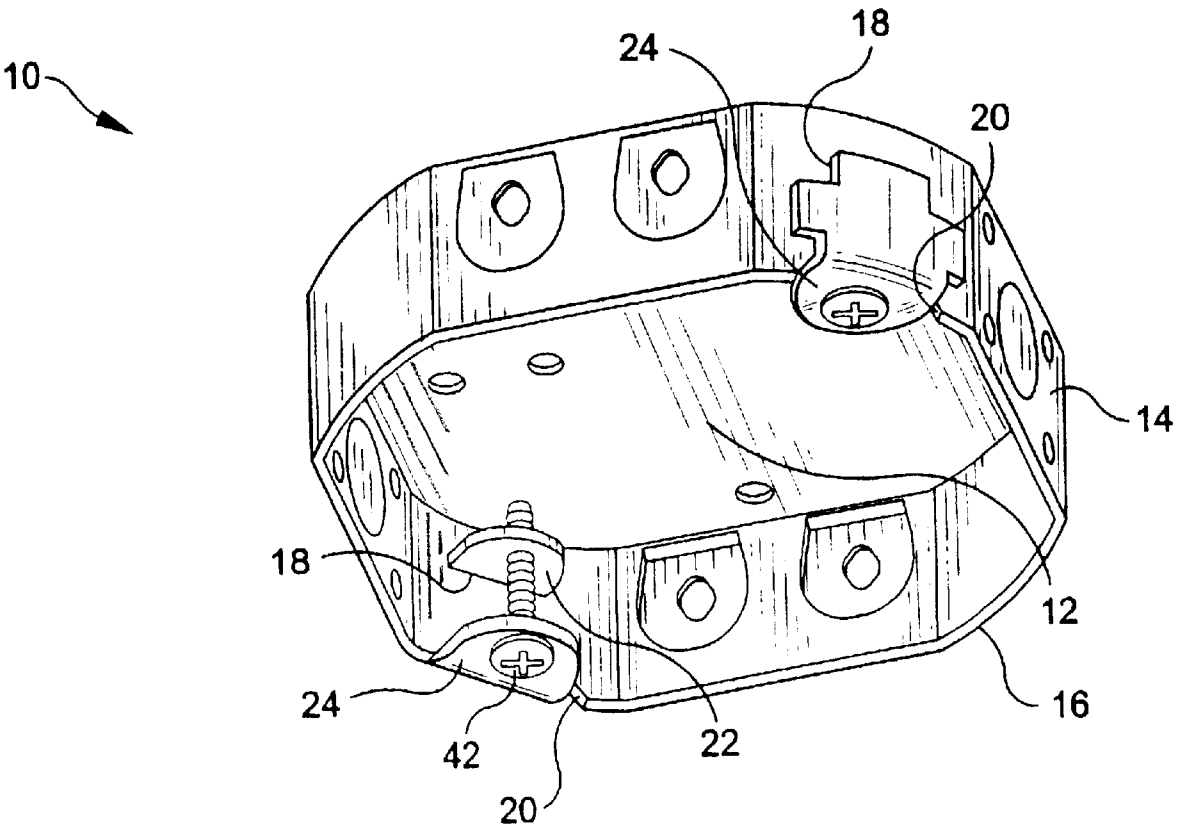
FIG. 1 is a side, bottom perspective view of a preferred embodiment of the ceiling box of this invention.
Figure 3:
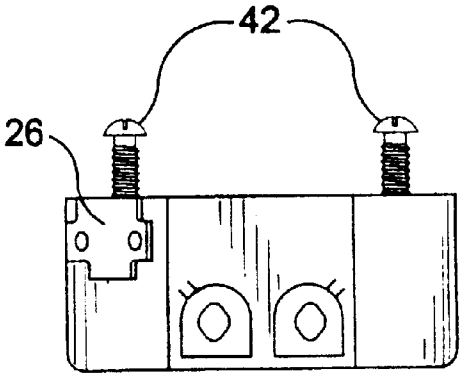
FIG. 3 is a side elevational view thereof.

Referring initially to FIG. 1, an electrical ceiling box 10 is shown, comprising a top portion 12 peripherally bounded by side portion 14. Top portion 12 and side portion 14 may be formed from separate pieces of metal and rigidly secured to one another, as by welding, or they may be contiguous components of a single piece of metal formed by stamping or any other suitable process. As with conventional ceiling boxes, box 10 has an open end defined by edge 16, which faces downward upon normal installation.

Figure 2:
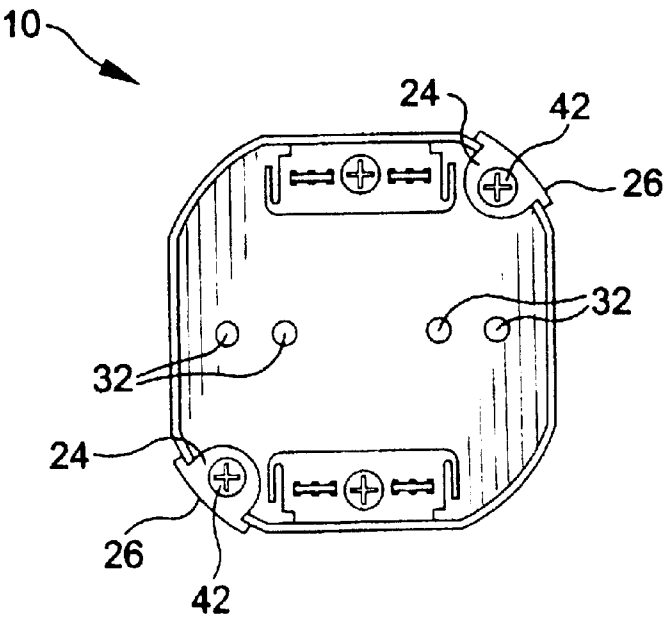
FIG. 2 is a bottom plan view thereof, on a reduced scale.
Figure 8:
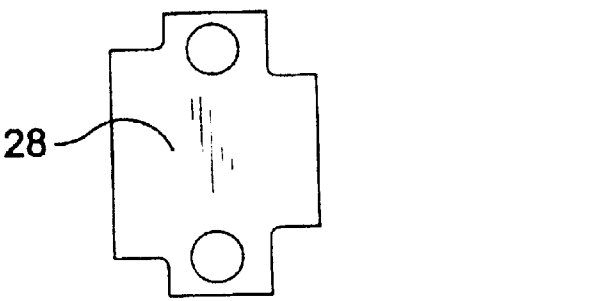
FIG. 8 is an end view of the ear lug shown in FIG. 7.
Figure 7:
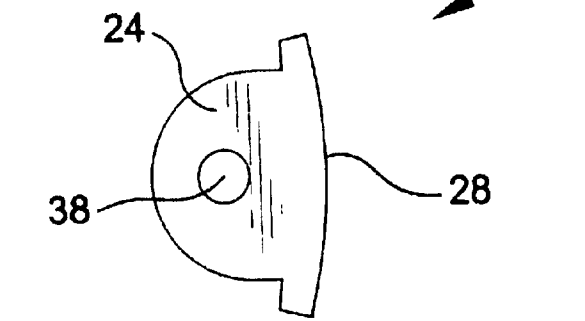
FIG. 7 is a bottom plan view of the ear lug used in this invention.
Figure 10:
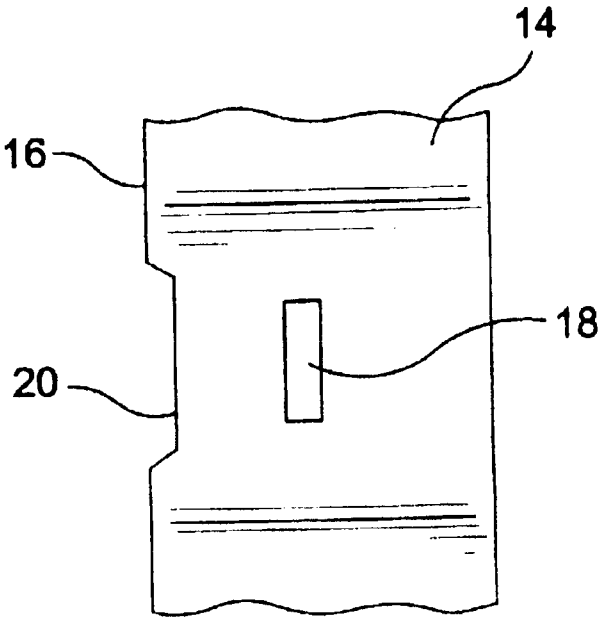
FIG. 10 is an elevational view of a portion of the exterior of the ceiling box, showing the slot and recessed area used to receive the ears of the ear lug.
Figure 9:
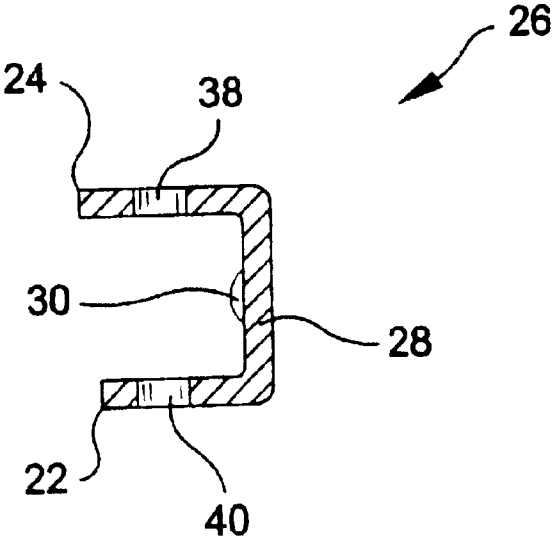
FIG. 9 is a side sectional view of the ear lug.

In the preferred embodiment of this invention, box 10 is generally octaganol in shape, as best seen in FIG. 2. A pair of slots 18, best seen in FIG. 10, are formed in opposite sides of box 10, as are a pair of recesses 20 formed in edge 16. Each slot 18 and its accompanying recess 20 are specially adapted to receive ears 22 and 24, respectively, of ear lug 26, best seen in FIGS. 7–9. As seen in FIG. 9, ears 22 and 24 are spaced apart and separated by a web portion 28, which preferably has a pair of raised buttons 30 formed thereon. Web 28 is preferably spot welded to the exterior surface of side portion 16 intermediate slot 18 and recess 20, with ears 22 and 24 extending inwardly into the interior cavity of box 10.

Figure 6:
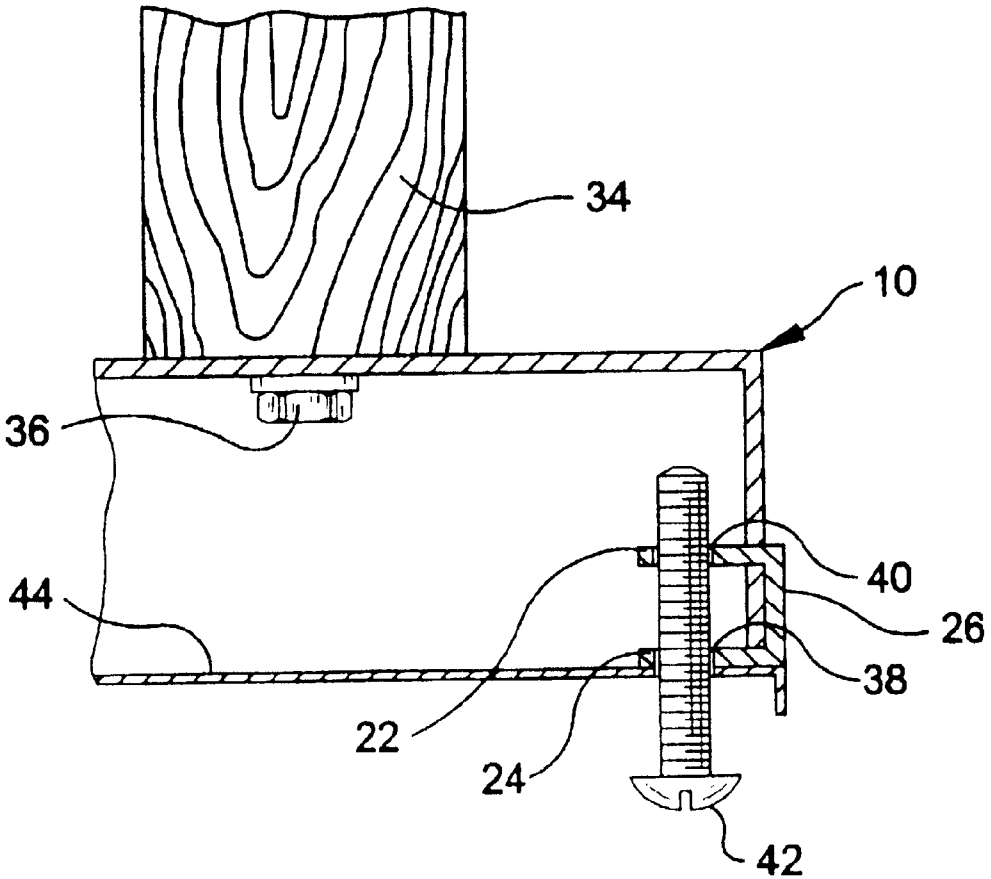
FIG. 6 is an enlarged sectional view taken through a portion of the preferred embodiment.

Top portion 12 of box 10 includes a plurality of holes 32 formed therethrough for use in securing box 10 to a conventional ceiling stud 34 by a screw 36, as shown in FIG. 6. In the preferred embodiment shown, ear 24 has a mounting hole 38 formed therethrough, while ear 22 has a receiving hole 40 formed therethrough. Mounting hole 38 has a smaller diameter than receiving hole 40, and is adapted to be threaded upon operative insertion of a self-tapping screw 42. A pair of screws 42 are preferably used to threadedly engage holes 38 on both ear lugs 18 to secure a conventional ceiling fan mounting plate 44 to box 10. With ears 24 being substantially flush with the plane defined by edge 16, holes 38 are easier to engage with screws 42 than in prior art devices having recessed mounting holes. Receiving hole 22 provides lateral support for the distal end of screw 42, thereby preventing unwanted flexing of ear 24 which, in conventional boxes, frequently leads to stress-related failure. Furthermore, it is preferred that ear lug 26 be formed from a heavier gauge metal than top portion 12 and side portion 14, thereby greatly enhancing the strength of box 10 when used to suspend a ceiling fan as disclosed herein.

Figure 5:
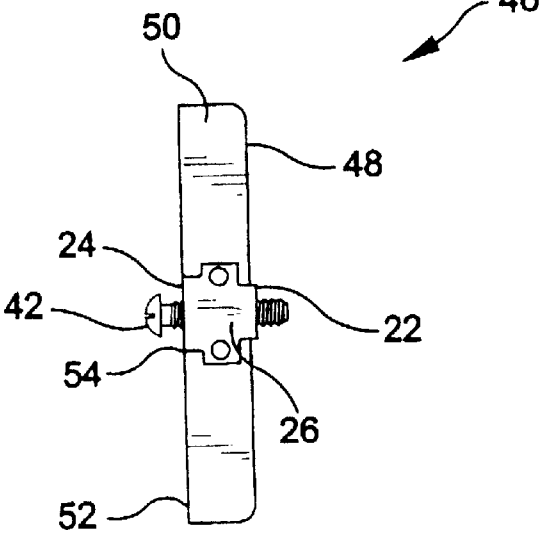
FIG. 5 is a side elevational view of the alternative embodiment shown in FIG. 4.
Figure 4:
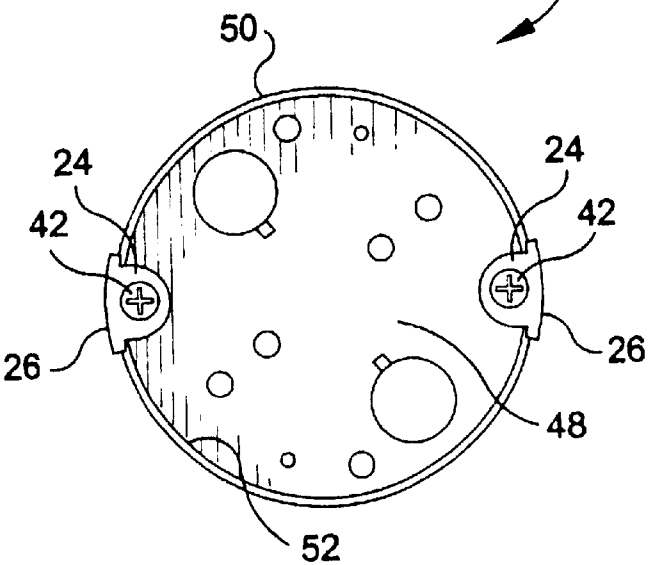
FIG. 4 is a bottom plan view of an alternative embodiment.

An alternative embodiment of this invention is shown in the form of box 46, depicted in FIGS. 4 and 5. As best seen in FIG. 4, box 46 comprises a top portion 48 peripherally bounded by a substantially circular side portion 50. As with box 10 discussed above, top portion 48 and side portion 50 of box 46 are preferably pressed from a single piece of metal, to form an open-ended outlet box having a downward facing edge 52 upon installation. In addition to having a circular cross-sectional configuration, box 46 is also shallower than box 10, which is preferable in certain mounting situations. Rather than having a pair of slots, such as slots 18, formed in side portion 50 for receiving ears 22 of ear lugs 26, ears 22 fits closely adjacent top portion 48 upon attachment of ear lugs 26 to side portion 50, with top portion 48 having suitable opening formed therethrough in alignment with receiving holes 40, thus allowing clearance for screws 42. Preferably, ear lugs 26 are welded to side portion 50, as with box 10, but other attachment means may be found suitable for the purpose. Edge 52 preferably includes a pair of recesses 54 for receiving ears 24, so that a generally flush surface may be maintained. Functionally, box 46 is substantially identical to box 10.

As those skilled in the art will readily appreciate, the use of ear lugs 26 in a ceiling box such as boxes 10 and 46 disclosed herein will significantly increase the strength of the box for purposes of mounting and suspending a ceiling fan, which is particularly important when installing a heavier fan. While the principles of the invention have been clear from the foregoing discussion of a preferred embodiment and one alternative embodiment, it is to be understood that numerous modifications may be made in the embodiments disclosed herein without departing from the spirit and scope of this invention. Accordingly, the scope should be limited only by the language of the following claims and prior art.

We claim:

1. An electrical ceiling box adapted to mount and support a ceiling fan, comprising:

a top portion;

a side portion rigidly coupled to said top portion and extending substantially normal thereto[,] forming a box open at one end and defining an interior cavity, said side portion having an exterior surface;

a pair of first ears rigidly secured to said side portion [and extending inwardly into said interior cavity], each of said first *pair of* ears having a mounting hole formed therethrough;

a pair of second ears rigidly secured to said side portion intermediate said first *pair of* ears and said top portion [and extending inwardly into said interior cavity], each of said second *pair of* ears having a receiving hole formed therethrough, each of said receiving holes being axially aligned with one of said mounting holes, wherein each of said mounting holes is adapted to threadedly engage a screw for mounting and supporting a ceiling fan thereto, and each of said receiving holes is adapted to allow said screw to extend non-engagingly therethrough[,]*; and* said first and second *pairs of* ears being integrally formed on a pair of ear lugs, each of said *pair of* ear lugs having *a web and* one of said first *pair of* ears and one of said second *pair of* ears formed thereon, [said first and second ears on each of said lugs being spaced a distance from each other and separated by a web] *one of said first pair of ears and one of said second pair of ears on each of said lugs extending from said web toward said interior cavity, and on each of said pair of lugs said web spacing one of said first pair of ears from one of said second pair of ears* thereby supporting said screw at two spaced locations along a length of said screw.

2. An electrical box as set forth in claim 1, wherein:

said top portion and said side portion are integrally formed with one another.

3. An electrical box as set forth in claim 1, wherein:

said side portion has a distal edge defining said open end of said box;

said side portion has a pair of slots formed therein for receiving said second ears; and each of said lugs is secured to said exterior surface of said side portion with one of said first ears extending into said interior cavity adjacent said distal edge and one of said second ears extending through one of said slots.

4. An electrical box as set forth in claim 1 wherein:

said web is spot welded to said exterior surface of said side portion.

5. An electrical box adapted to mount and support a ceiling fan comprising:

a top portion;

a side portion rigidly coupled to said top portion and extending substantially normal thereto, forming a box open at one end and defining an interior cavity, said side portion having an exterior surface; and a pair of lugs, each of said pair of lugs having a first and a second ear integrally formed with, and separated by, a web portion, said web portion of each of said pair of lugs being rigidly secured to said side portion, said first and second ears extending inwardly [into] *toward* said interior cavity, said first ears being disposed adjacent said open end of said box, each of said first ears having a mounting hole formed therethrough and each of said second ears having a receiving hole formed therethrough, said mounting holes being axially aligned with said receiving holes, wherein each of said mounting holes is adapted to threadedly engage a screw for mounting and supporting a ceiling fan thereto, and each of said receiving holes is adapted to allow said screw to extend non-engagingly therethrough.

6. An electrical box as set forth in claim 5, wherein:

each of said web portions is secured to said side portion by welding.

7. An electrical box as set forth in claim 5, wherein:

said first ears are substantially flush with said open end of said box.

8. An electrical ceiling box adapted to mount and support a ceiling fan, comprising:

a top portion;

a side portion rigidly coupled to said top portion and extending substantially normal thereto, forming a box open at one end and defining an interior cavity, said side portion having an exterior surface; said side portion has a distal edge defining said open end of said box;

a pair of first ears rigidly secured to said side portion and extending inwardly [into] *toward* said interior cavity, each of said first ears having a mounting hole formed therethrough;

a pair of second ears rigidly secured to said side portion intermediate said first ears and said top portion and extending inwardly [into] *toward* said interior cavity, each of said second *pair of* ears having a receiving hole formed therethrough, each of said receiving holes being axially aligned with one of said mounting holes, wherein each of said mounting holes is adapted to threadedly engage a screw for mounting and supporting a ceiling fan thereto, and each of said receiving holes is adapted to allow said screw to extend non-engagely therethrough;

said first and second ears are integrally formed on a pair of ear lugs, each of said *pair of* ear lugs having one of said first *pair of* ears and one of said second *pair of* ears formed thereon, said first and second *pairs of* ears being spaced apart and separated by a web;

said side portion further including a pair of slots formed therein for receiving said second ears; and each of said *pair of* ear lugs being secured to said exterior surface of said side portion with one of said first ears extending [into] *toward* said interior cavity adjacent said distal edge and one of said second ears extending through one of said slots.

9. An electrical ceiling box adapted to mount and support a ceiling fan, comprising:

a top portion;

a side portion rigidly coupled to said top portion and extending substantially normal thereto, forming a box open at one end and defining an interior cavity, said side portion having an exterior surface;

a pair of first ears rigidly secured to said side portion and extending inwardly [into] *toward* said interior cavity, each of said first ears having a mounting hole formed therethrough;

a pair of second ears rigidly secured to said side portion intermediate said first ears and said top portion and extending inwardly [into] *toward* said interior cavity, each of said second ears having a receiving hole formed therethrough, each of said receiving holes being axially aligned with one of said mounting holes, wherein each of said mounting holes is adapted to threadedly engage a screw for mounting and supporting a ceiling fan thereto, and each of said receiving holes is adapted to allow said screw to extend non-engagingly therethrough;

said first and second ears being integrally formed on a pair of ear lugs, each of said ear lugs having one of said first ears and one of said second ears formed thereon, said first and second ears being spaced apart and separated by a web, said web being rigidly secured to said exterior surface of said side portion.

10. An electrical box adapted to mount and support a ceiling fan, comprising:

a top portion;

a side portion rigidly coupled to said top portion and extending substantially normal thereto, forming a box open at one end and defining an interior cavity, said side portion having an exterior surface; and a pair of lugs each of said lugs comprises a first and second ear integrally formed with, and separated by, a web portion; and said web portion of each of said lugs is rigidly secured to said side portion, said side portion has a pair of slots formed therein for receiving said second ears, said web portions being secured to said exterior surface of said side portion with said second ears extending inwardly through said slots, said first and second ears extending inwardly [into] *toward* said interior cavity, said first ears being disposed adjacent said open end of said box, each of said first ears having a mounting hole formed therethrough and each of said second ears having a receiving hole formed therethrough, said mounting holes being axially aligned with said receiving holes, wherein each of said mounting holes is adapted to threadedly engage a screw for mounting and supporting a ceiling fan thereto, and each of said receiving holes is adapted to allow said screw to extend non-engagingly therethrough.

11. An electrical box adapted to mount and support a ceiling fan, comprising:

a top portion;

a side portion rigidly coupled to said top portion and extending substantially normal thereto, forming a box open at one end and defining an interior cavity, said side portion having an exterior surface; and a pair of lugs rigidly secured to said side portion, each of said lugs comprises a first and second ear integrally formed thereon, and each of said lugs having a central elongate web portion having an upper and lower end, one of said first ears being formed on said upper portion and one of said second ears being formed on said lower portion, said first and second ears being spaced apart and separated by said web for accommodating a screw at two spaced locations along its length, said first and second ears extending inwardly [into] *toward* said interior cavity, said first ears being disposed adjacent said open end of said box, each of said first ears having a mounting hole formed therethrough and each of said second ears having a receiving hole formed therethrough, said mounting holes being axially aligned with said receiving holes, wherein each of said mounting holes is adapted to threadedly engage the screw for mounting and supporting a ceiling fan thereto, and each of said receiving holes is adapted to allow the screw to extend non-engagingly therethrough.

12. An electrical ceiling box adapted to mount and support a ceiling fan, comprising;

a top portion;

a side portion rigidly coupled to said top portion and extending substantially normal thereto, forming a box open at one end and defining an interior cavity, said side portion having an exterior surface;

a pair of first [cars] *ears* rigidly secured to said side portion and extending inwardly [into] *toward* said interior cavity;

a pair of second ears rigidly secured to said side portion intermediate said first ears and said top portion and extending inwardly [into] *toward* said interior cavity, each of said first and second ears having an aperture for supporting a mounting screw, said first and second ears being integrally formed on a pair of ear lugs, each of said ear lugs having one of said first ears and one of said second ears formed thereon, said first and second ears on each of said lugs being positioned in axially spaced relation to each other and separated by a web, thereby supporting said screw at two spaced locations along a length of said screw *, and said first and second ears on each of said lugs extending form said web toward said interior cavity.*

*13. An electrical box adapted to mount and support a ceiling fan comprising:*

*a top portion;*

*a side portion rigidly coupled to said top portion and extending substantially normal thereto, forming a box open at one end and defining an interior cavity, said side portion having an exterior surface; and*

*a pair of lugs rigidly secured to said side portion, each of said pair of lugs having a first and a second ear formed therewith and separated by a web portion having a vertical extent,*

*said first and second ears extending from said side portion inwardly toward said interior cavity,*

*said first ears being disposed adjacent said open end of said box and each having a mounting hole formed therethrough, and each of said second ears having a receiving hole formed therethrough, said mounting holes being axially aligned with said receiving holes and spaced therefrom a distance which is substantially equivalent to the vertical extent of said web, and each of said mounting holes being adapted to threadedly engage a screw for mounting and supporting a ceiling fan thereto, and each of said receiving holes being adapted to allow said screw to extend non-engagingly therethrough.*

*14. An electrical box as set forth in claim 13, wherein said web of at least one of said pair of lugs abuts said side portion.*

* * * * *

UNITED STATES PATENT AND TRADEMARK OFFICE

CERTIFICATE OF CORRECTION

PATENT NO. : RE 38,120 E
DATED : August 6, 2003
INVENTOR(S) : Bordwell et al.

It is certified that error appears in the above-identified patent and that said Letters Patent is hereby corrected as shown below:

Title page,
Item [74], *Attorney, Agent or Firm*, now reads "Hoffman & Baron, LLP", should read -- Hoffmann & Baron, LLP --.

Column 4,
Lines 25-27, now reads "and on each of said pair of lugs said web spacing one of said first pair of ears from one of said second pair of ears", and should read -- and said web spacing one of said first pair of ears from one of said second pair of ears on each of said pair of lugs --.

Signed and Sealed this

Fourth Day of November, 2003

JAMES E. ROGAN
*Director of the United States Patent and Trademark Office*